(12) United States Patent
Dix et al.

(10) Patent No.: US 8,674,546 B1
(45) Date of Patent: Mar. 18, 2014

(54) REDUNDANT POWER OVER ETHERNET

(75) Inventors: David Porter Dix, San Francisco, CA (US); Brian Davis, Sunnyvale, CA (US)

(73) Assignee: ShoreTel, Inc., Sunnyvale, CA (US)

( * ) Notice: Subject to any disclaimer, the term of this patent is extended or adjusted under 35 U.S.C. 154(b) by 511 days.

(21) Appl. No.: 13/044,783

(22) Filed: Mar. 10, 2011

(51) Int. Cl.
*H02J 7/00* (2006.01)

(52) U.S. Cl.
USPC .......................................................... 307/65

(58) Field of Classification Search
USPC .......................................................... 307/65
See application file for complete search history.

(56) References Cited

U.S. PATENT DOCUMENTS

| | | |
|---|---|---|
| 6,473,608 B1 | 10/2002 | Lehr et al. |
| 2005/0122958 A1 | 6/2005 | Shim et al. |
| 2006/0077888 A1* | 4/2006 | Karam et al. ................ 370/216 |
| 2010/0199113 A1 | 8/2010 | Lee |

FOREIGN PATENT DOCUMENTS

CN 101594236 A 2/2009

OTHER PUBLICATIONS

JetNet Ethernet Switch 4700 Series, JetNet 4706 Industrial 6-Port Managed PoE Plus Switch, Data Sheet. Retrieved from Korenix website at http://www.korenix.com/jet-ethernet-switch-4700-series.htm on Jul. 28, 2011, 7 pages.
Trapeze Networks, Mobility Point® MP-432 Data Sheet. Retrieved from Central Virginia Datacomm website at http://www/cv-data.com/trapeze.xhtml on Jul. 28, 2011, 6 pages.
Franklin, Curtis F. Jr. "3Com IntelliJack—Networking Made for Electrical Contractors" Electrical Contracting Products, Jun./Jul. 2004, 2 pages.

* cited by examiner

*Primary Examiner* — Robert L. Deberadinis
(74) *Attorney, Agent, or Firm* — Kilpatrick Townsend & Stockton LLP (57) ABSTRACT

A VoIP switch includes a first input Ethernet port configured to receive electrical power from a first power sourcing equipment, and a second input Ethernet port configured to receive electrical power from a second power sourcing equipment. The VoIP switch may be configured such that the first input Ethernet port is powered by the first power sourcing equipment concurrently with the second input Ethernet port being powered by the second power sourcing equipment.

19 Claims, 6 Drawing Sheets

REDUNDANT POWER OVER ETHERNET

FIELD OF INVENTION

The present invention relates generally to powered devices and, more particularly, to methods and apparatuses that utilize power over Ethernet (PoE) for redundant electrical power.

BACKGROUND

PoE technology provides electrical power and data over Ethernet cabling. Power provided by PoE is often used to replace AC power for network devices such as routers, hubs, gateways, access points, voice over IP (VoIP) switches, IP private branch exchange (PBX) boxes, and the like. PoE can also be used to power endpoint devices such as VoIP telephones, network paging systems, webcams, and the like. PoE can offer cost advantages over conventional AC power and eliminate conventional "wall wart" electrical converters.

As uses of PoE increase, there is a continual need for improved methods and apparatuses utilizing PoE technology.

SUMMARY

Some embodiments of the present invention provide improved methods and apparatuses that utilize PoE technology for redundant electrical power. In one embodiment, for example, a VoIP switch that is used to manage communication devices includes a first input Ethernet port configured to receive electrical power from a first power sourcing equipment. The VoIP switch also includes a second input Ethernet port configured to receive electrical power from a second power sourcing equipment. The VoIP switch may be configured such that the first input Ethernet port is powered by the first power sourcing equipment concurrently with the second input Ethernet port being powered by the second power sourcing equipment.

In accordance with another embodiment, a method for receiving electrical power at a powered device includes receiving first electrical power using a first input Ethernet port at the powered device, where the first electrical power is received from a first power sourcing equipment. The method also includes receiving second electrical power using a second input Ethernet port at the powered device, where the second electrical power is received from a second power sourcing equipment. The first input Ethernet port may be powered by the first power sourcing equipment concurrent with the second input Ethernet port being powered by the second power sourcing equipment.

In accordance with yet another embodiment, a powered device comprises a first input port configured to receive electrical power and data, and a second input port configured to receive electrical power and data. The first input port and the second input port may be configured such that the first input port is powered by a first power sourcing equipment concurrently with the second input port being powered by a second power sourcing equipment.

Numerous benefits are achieved using the present invention over conventional techniques. For example, some embodiments include VoIP switches having multiple input Ethernet ports configured to be powered concurrently. The ports can provide redundancy in the event one of them fails without requiring a re-boot or delay to activate a secondary port. Other embodiments include methods for receiving electrical power from multiple input Ethernet ports that are powered concurrently. This can also provide redundancy. Depending on the embodiment, one or more of these benefits may exist. These and other benefits are described throughout the specification and more particularly below.

DETAILED DESCRIPTION

In accordance embodiments of the present invention, improved methods and apparatuses that utilize PoE technology for redundant electrical power are provided. In one embodiment, for example, a VoIP switch includes multiple input Ethernet ports configured to receive network data and electrical power. Two or more of the multiple input Ethernet ports can be powered, or in an active state, at the same time. The powered input Ethernet ports can provide redundancy if one or more of the ports fail. The ports can provide redundant electrical power without requiring a re-boot or delay to activate a secondary port. The ports can also be configured to receive electrical power simultaneously thus providing more electrical power than that which can be provided by a single port. These and other benefits are described more fully below.

Figure 1:
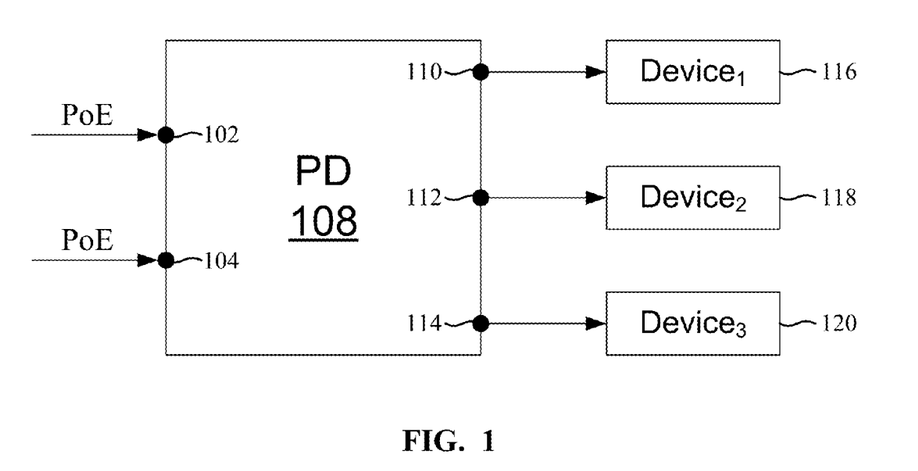
FIG. 1 is a simplified block diagram of a powered device having multiple input Ethernet ports in accordance with an embodiment of the invention.

FIG. 1 is a simplified block diagram of a powered device (PD) 108 having multiple input Ethernet ports 102, 104 in accordance with an embodiment of the invention. Each input Ethernet port 102, 104 is configured to receive electrical power via PoE. Each input Ethernet port 102, 104 may also be configured to receive network data. In this example, the PD 108 also has three output ports 110, 112, 114. The output ports 110, 112, 114 may be Ethernet ports configured to provide PoE and/or data to other network devices such as devices 116, 118, 120. It should be appreciated that the PD 108 is exemplary, and PDs in accordance with embodiments of the invention may include more than two input Ethernet ports and any number of output ports (including none at all).

In an embodiment, the input Ethernet ports 102, 104 may be configured to be powered at the same time. The input Ethernet ports 102, 104 are powered if they are in an active state with a power sourcing equipment (PSE). The PSE is the equipment that provides electrical power to the port via PoE. The requirements and procedure for establishing an active state may vary depending on the particular PSE and/or PD, but most devices comply with one of the IEEE 802.3 PoE standards that require a specific handshake process. As an example, the IEEE 802.3-2005 PoE standards specifies a handshake process that involves the PSE applying a low voltage to the Ethernet cable, the PD responding with a valid signature, the PSE applying a higher classification voltage, the PD responding with a classification signature based on power needs, and the PSE applying an operational voltage. Following the handshake process, the PD is powered or in an active state with the PSE.

Once an input Ethernet port is powered, the PSE monitors power usage. If the power usage falls below a threshold, the PSE removes power and the port reverts to an unpowered or inactive state. Again, threshold conditions may vary, but most devices comply with one of the IEEE 802.3 PoE standards. As an example, the IEEE 802.3-2005 PoE standard specifies a Maintain Power Signature (MPS) that requires usage of at least 10 mA for a minimum duration of at least 75 ms followed by an optional dropout for no longer than 250 ms. Ports not meeting the MPS must repeat the handshake process to re-establish a powered or active state with the PSE.

For the input Ethernet ports 102, 104 to be powered at the same time, each must complete a handshake procedure with a PSE and use at least a minimum electrical power to maintain an active state. Because both input Ethernet ports 102, 104 are powered concurrently, if one of them fails the other can receive power without requiring a re-boot of the PD 108 to configure the port and/or having to wait for the port to complete a handshake process. Thus, electrical power can be provided to the PD 108 seamlessly by either of the input Ethernet ports 102, 104. Either of the input Ethernet ports 102, 104 can also provide a network connection thus redundant network access. This enables the PD 108 to receive electrical power and provide network services without interruption.

In an embodiment, the input Ethernet ports 102, 104 can alternately provide electrical power to the PD 108. This can be used, for example, to provide essentially constant electrical power to the PD 108 while maintaining both input Ethernet ports 102, 104 in a powered or active state. The alternating frequency can be selected such that both of the input Ethernet ports 102, 104 meet the threshold power requirements or provide a MPS for the PSE and thus remain powered throughout the cycle.

Also, the input Ethernet ports 102, 104 can both provide electrical power to the PD 108 simultaneously. This can be used, for example, in situations where the power requirement of the PD 108 is greater than that which can be provided by either of the input Ethernet ports 102, 104 individually. The input Ethernet ports 102, 104 may provide electrical power simultaneously to meet short-term or long-term requirements of the PD 108.

The PD 108 illustrated in FIG. 1 may be any one of a number of network devices including a router, hub, gateway, access point, VoIP switch, IP PBX box, or the like. As an example, the PD 108 may be VoIP switch configured to manage communications between the devices 116, 118, 120. In this example, the devices 116, 118, 120 may be IP phones, analog phones, soft phones, button boxes, or other communication devices. Such a VoIP switch may also include connections to servers and databases, trunking capability, one or more connections to the Public Switched Telephone Network (PSTN), and the like. As explained above, the input Ethernet ports 102, 104 may be powered at the same time and provide electrical power to the VoIP switch either alternately or simultaneously. Additionally, the VoIP switch may act as a PSE providing electrical power to one or more of the devices 116, 118, 120 and/or other connected devices not shown in this example.

Figure 2:
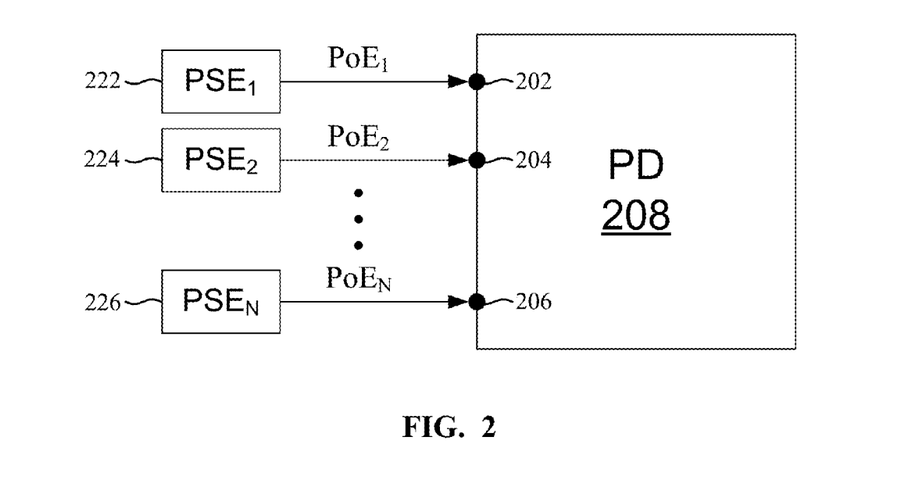
FIG. 2 is a simplified block diagram of a powered device having multiple input Ethernet ports powered by different power sourcing equipment in accordance with an embodiment of the invention.

FIG. 2 is a simplified block diagram of a PD 208 having multiple input Ethernet ports 202, 204, 206 each powered by different PSEs 222, 224, 226 in accordance with an embodiment of the invention. While multiple input Ethernet ports may be powered by the same PSE in some embodiments, in this example each of the input Ethernet ports 202, 204, 206 are powered by different PSEs 222, 224, 226. As shown in FIG. 2, the PD 208 may have any number of input Ethernet ports configured to provide electrical power via PoE (e.g., $PoE_1, PoE_2, \ldots PoE_N$). Each of the input Ethernet ports can be powered by a different PSE. If one or more of the PSEs 222, 224, 226 fail, electrical power can be provided by one or more of the other PSEs. This can improve system performance and reliability.

The PD 208 illustrated in FIG. 2 may be any one of a number of network devices including a router, hub, gateway, access point, VoIP switch, IP PBX box, or the like. The PD 208 may or may not include output ports and support other devices. The PD 208 may also be any one of a number of endpoint devices such as an IP phone, a speakerphone, a webcam, a button box, or the like.

Figure 3:
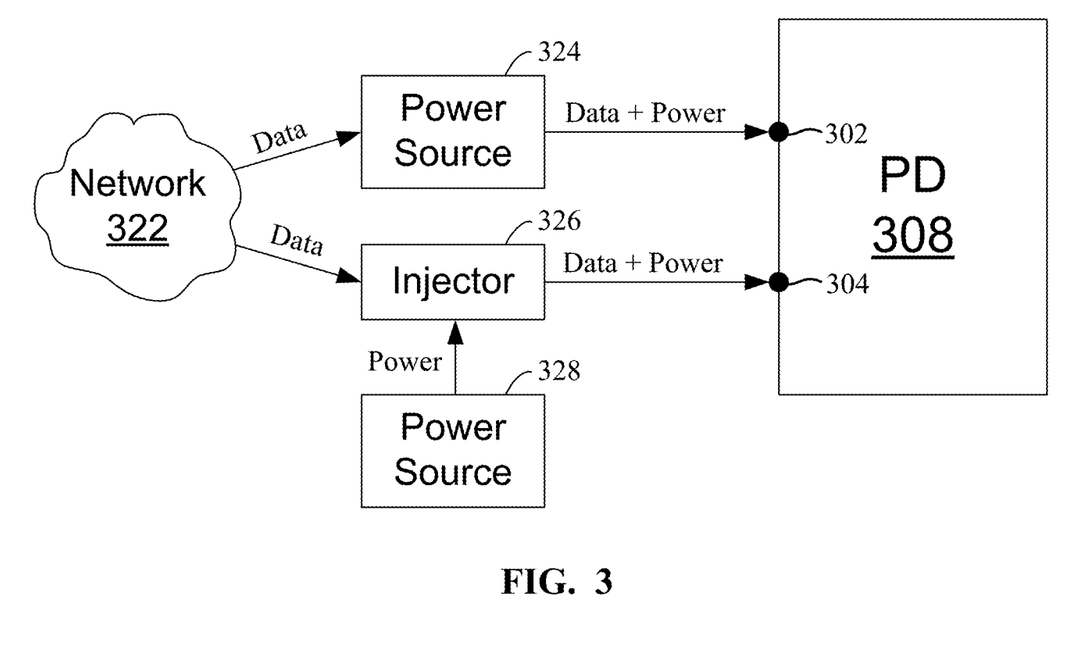
FIG. 3 is a simplified block diagram of a powered device having multiple input Ethernet ports in accordance with another embodiment of the invention.

FIG. 3 is a simplified block diagram of a PD 308 having multiple input Ethernet ports 302, 304 in accordance with another embodiment of the invention. As shown in this example, each input Ethernet port 302, 304 may be configured to receive data and power. The input Ethernet port 302 receives data from network 322 and electrical power from endspan power source 324. The input Ethernet port 304 receives data from the network 322 and electrical power from midspan power source 328 and injector 326. One of ordinary skill in the art would recognize many variations, modifications, and alternatives in light of the present disclosure.

As explained above, a PD can be configured with multiple input Ethernet ports to provide redundancy in the event of a failure (e.g., input Ethernet port fails, PSE fails, network connection fails, and the like). If a port goes down, one or more other input Ethernet ports can be used to receive power and data for the PD. In some embodiments, functionality of the PD and/or devices powered by the PD may be reduced when a port goes down. As an example, a PD receiving electrical power from two input Ethernet ports simultaneously may not receive enough power from one port to continue providing full functionality in the event that one of the ports goes down. In such a scenario, the PD may reduce functionality rather than shut down completely.

Figure 4:
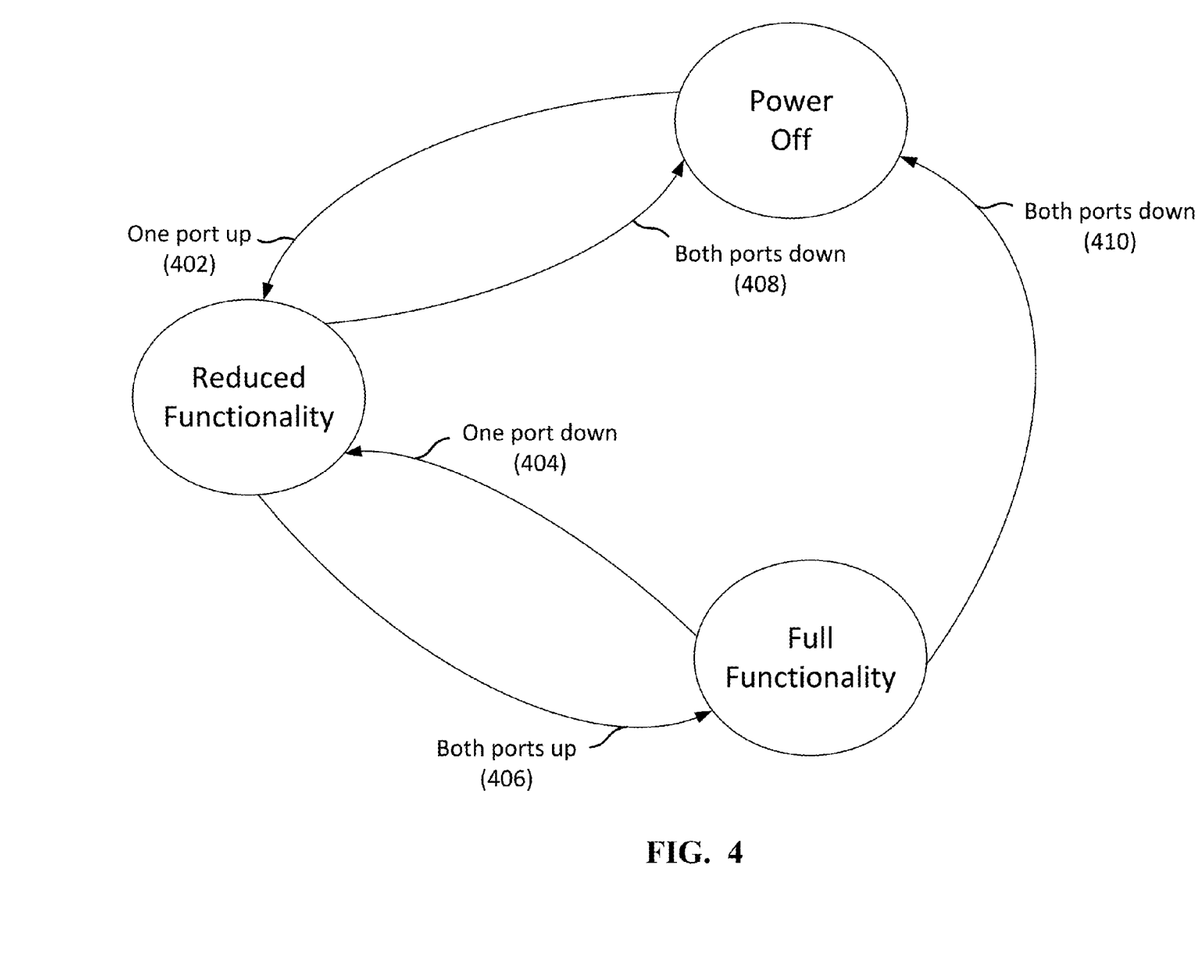
FIG. 4 is a simplified state diagram illustrating a method of power management for a powered device having two input Ethernet ports in accordance with an embodiment of the invention.

This can be illustrated with reference to FIG. 4, which is a simplified state diagram illustrating a method of power management for a PD having two input Ethernet ports configured to receive PoE in accordance with an embodiment of the invention. As shown in this example, full functionality is provided when both ports are up (406). If one port goes down (404), the PD may shut down non-critical functions and provided reduced functionality. If the PD provides electrical power to other devices, the PD may also instruct the other devices to shut down non-critical functions. If both ports go down (408), (410) the PD is not receiving electrical power and powers down. Upon power up, the PD may provide reduced functionality after a first port comes up (402) and provide full functionality after both ports come up (406). One of ordinary skill in the art would recognize many variations, modifications, and alternatives in light of the present disclosure.

In an embodiment, a PD may monitor a status of each input Ethernet port. A status indicator may be used to identify ports that are powered, ports that are up but not powered, ports that are down, and the like. Depending on the number of ports and the status of each port, if a port goes down and/or the electrical power provided to the PD drops below a critical level, the PD may send out a system message indicating that non-critical functions will be shut down and initiate a power management procedure. As an example, if the PD is a VoIP switch that provides PoE to other devices, the power management procedure may include cutting power to output ports that consume the most power (e.g., analog extension ports) and powering down any digital signal processors (DSPs) associated with these ports. Alternatively, the procedure may include reducing power to some ports while continuing to provide power to a subset of ports that may be identified as critical, even if one or more of the critical ports are higher powered ports. This may involve determining an output port priority by a system administrator or designating a priority using hardware and/or software. The procedure may also involve instructing the devices on at least some of the ports to reduce LED and display brightness (e.g., VoIP phone displays), limiting compute resources to a minimum, turning off speakerphone use, and/or turning off data connections to devices having redundant ports. The reduced functionality provided by the VoIP switch may include maintaining IP phone management and other services such as trunking capability.

Initiation of a power management procedure may perform all specified tasks, or specific tasks may be linked to a particular power level and only the specific tasks performed depending on the power available to the PD. The specific tasks and conditions may be determined by a system administrator or based on default rules. As would be appreciated by one of ordinary skill in the art, such power management procedures may be implemented by hardware, software, or any combination thereof. Additionally, the procedures may be under control of the PD or another device (e.g., system server) that is in communication with the PD.

Figure 5:
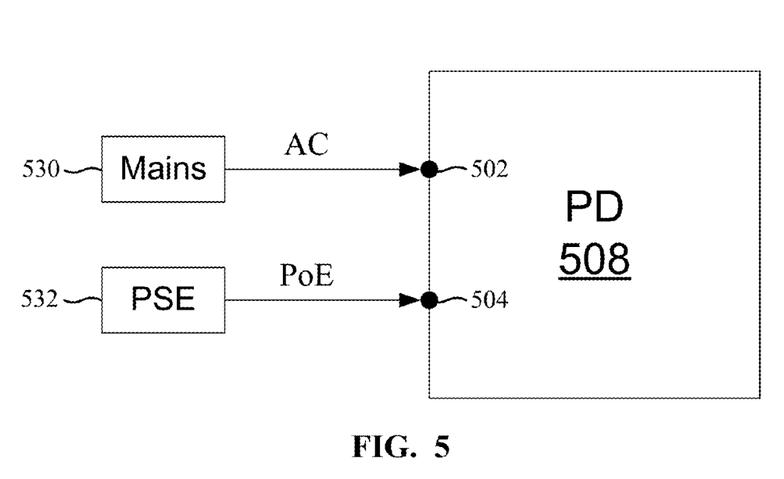
FIG. 5 is a simplified block diagram of a powered device having an AC input and a PoE input in accordance with an embodiment of the invention.

FIG. 5 is a simplified block diagram of a PD 508 having an AC input 502 and a PoE input 504 in accordance with an embodiment of the invention. In this configuration, the AC and PoE power supplies may be isolated using a or-ing diode or field effect transistor (FET) circuit in accordance with known techniques. The AC input 502 receives electrical power from mains 530, and the PoE input 504 receives electrical power from PSE 532. The PoE input 504 may also receive network data. In this example, the PSE 532 may serve as backup to the mains 530 for electrical power. Alternatively, the mains 530 may serve as backup to the PSE 532 for electrical power. As an example, if the PSE 532 serves as backup to the mains 530 and electrical power to AC input 502 is lost, the PD 508 may receive electrical power using PoE input 504. As explained above, the PoE input 504 may remain powered by using a minimum power even when not being used by the PD 508 for electrical power. Thus, when the mains 530 goes down, the PD 508 can seamlessly switch to receiving electrical power from PoE input 504. If the PoE input 504 is not able to provide sufficient electrical power for the PD 508 to provide full functionality, the PD 508 may provide reduced functionality by shutting down non-critical functions as described above.

In a similar manner, a PD having a single input Ethernet port configured to receive PoE may shut down non-critical functions if a PSE that is powering many PDs has to switch from PoE to backup electrical power. The backup electrical power may be supplied, for example, by an uninterruptible power supply (UPS). This may be especially advantageous when the UPS is battery powered and shutting down non-critical functions can conserve and extend battery power. Similar methods may also be implemented with PDs configured to receive AC power from the mains and backup electrical power from a UPS.

Figure 6:
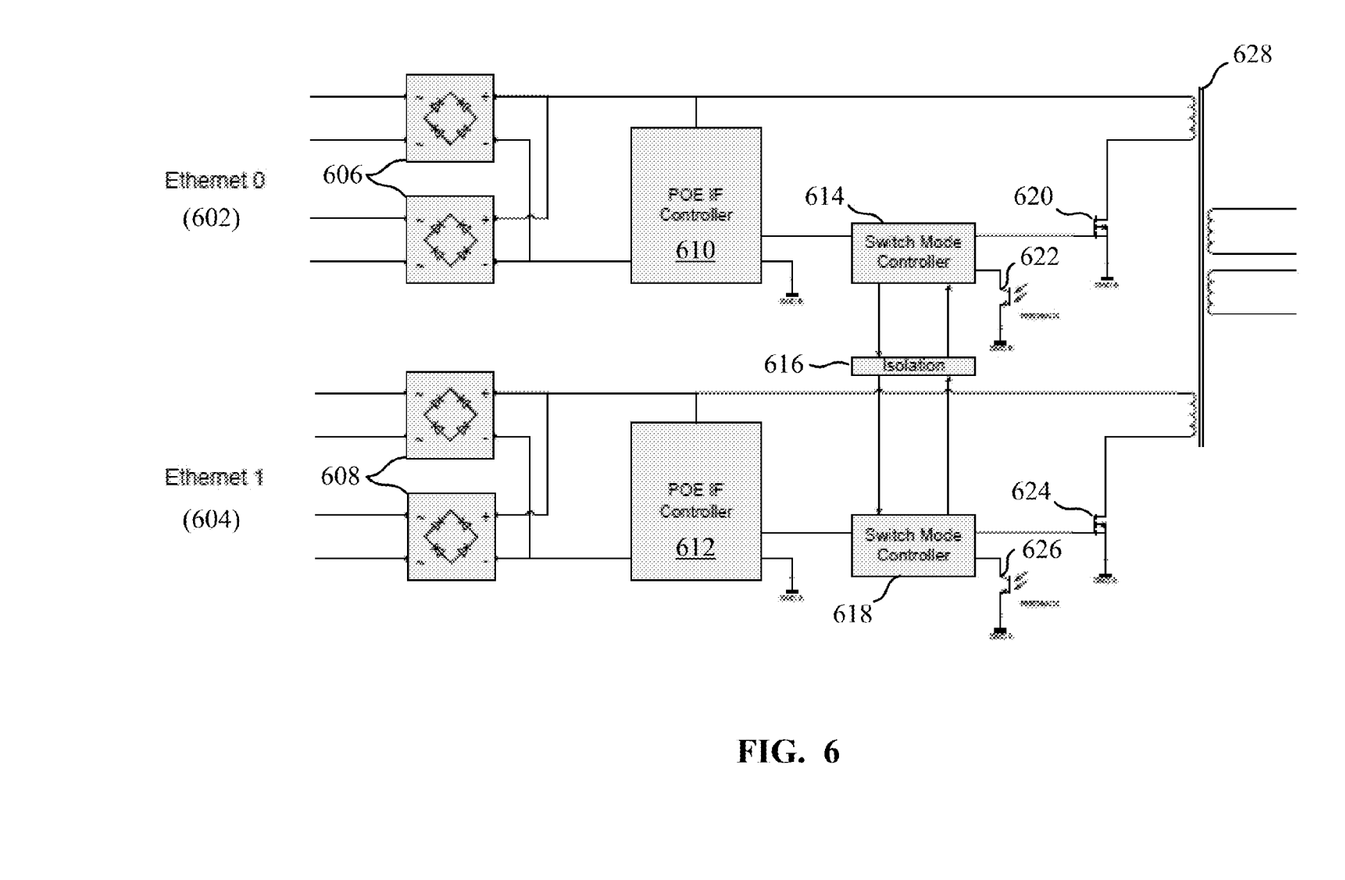
FIG. 6 is a simplified circuit diagram of a power supply having multiple input Ethernet ports in accordance with an embodiment of the invention.

In accordance with embodiments of the invention, a PD having multiple input Ethernet ports may have a single power supply configured to receive electrical power from each of the ports, or the PD may have multiple power supplies each coupled to one or more of the ports. As an example, FIG. 6 is a simplified circuit diagram of a power supply having multiple input Ethernet ports in accordance with an embodiment of the invention. This diagram provides an example of a switching power supply with two input Ethernet ports. The switching power supply may be configured to keep both of the Ethernet ports powered at the same time, and may be configured to receive electrical power alternately from each of the input Ethernet ports as described above. The switching power supply may be configured to provide electrical power for a PD using 48V DC inputs at each of the input Ethernet ports 602, 604. The 48V DC is supplied to the input Ethernet ports 602, 604 using wire pairs in the Ethernet cabling in accordance with known techniques. Rectifiers 606, 608 provide for reception of power over either pair or pairs in any polarity as required by a POE specification. PoE IF controllers 610, 612 provide a handshaking function with the PSE to establish a powered (or active) state. Switch mode controllers 614, 618 provide a control function to regulate a final desired voltage at an output of the power supply. Isolation 616 provides electrical isolation between different PSEs that may provide electrical power to the input Ethernet ports 602, 604. Opto-isolators 622, 626 allow for electrically isolated feedback from the output using known techniques. MOSFETS 620, 624 drive a primary winding of a flyback transformer 628 using known techniques. The transformer 628 provides isolation between an input source and output of the power supply using known techniques.

Figure 7:
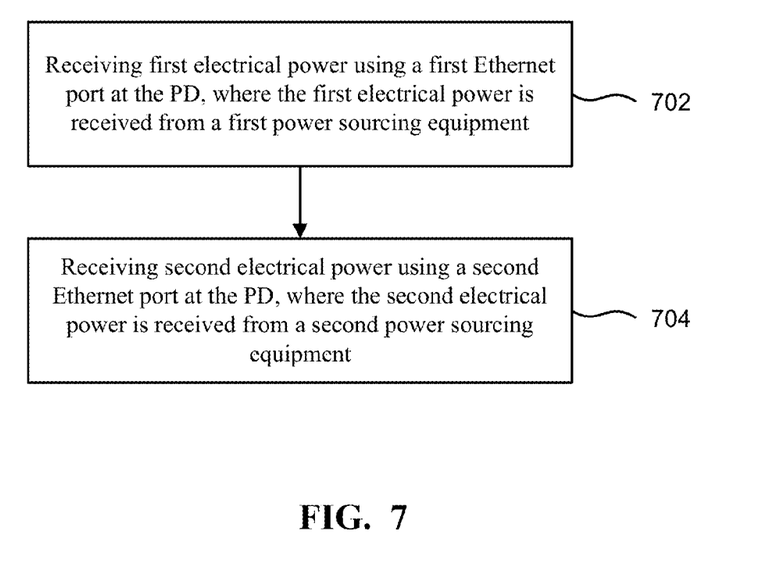
FIG. 7 is a simplified flowchart illustrating a method for receiving electrical power at a powered device in accordance with an embodiment of the invention.

FIG. 7 is a simplified flowchart illustrating a method for receiving electrical power at a PD in accordance with an embodiment of the invention. The method includes receiving first electrical power using a first input Ethernet port at the PD, where the first electrical power is received from a first power sourcing equipment (702). The method also includes receiving second electrical power using a second input Ethernet port at the PD, where the second electrical power is received from a second power sourcing equipment (704). In an embodiment, the first input Ethernet port may be powered by the first power sourcing equipment concurrent with the second input Ethernet port being powered by the second power sourcing equipment. In another embodiment, the first electrical power may be received at the PD using the first input Ethernet port simultaneously with the second electrical power being received at the PD using the second input Ethernet port. In yet another embodiment, electrical power may be received at the PD alternately using the first input Ethernet port and the second input Ethernet port.

It should be appreciated that the above embodiments utilizing PoE to provide redundant electrical power may also apply to methods and apparatuses utilizing electrical power via USB. For example, a PD may be configured with multiple input USB ports each configured to receive electrical power for the PD. The input USB ports may be configured to be powered concurrently and to provide electrical power simultaneously. Alternatively, a PD may be configured with one or more input Ethernet ports each configured to receive PoE, as well as one or more USB ports each configured to receive electrical power. The input Ethernet ports and the input USB ports may be configured to be powered concurrently and to provide backup in the event of a failure. One of ordinary skill in the art would recognize many variations, modifications, and alternatives in light of the present disclosure.

It should be noted that some embodiments of the present invention may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may be adapted to perform the necessary tasks. The term "computer-readable medium" includes, but is not limited to, portable or fixed storage devices, optical storage devices, wireless channels, sim cards, other smart cards, and various other mediums capable of storing, containing, or carrying instructions or data.

While the present invention has been described in terms of specific embodiments, it should be apparent to those skilled in the art that the scope of the present invention is not limited to the embodiments described herein. For example, features of one or more embodiments of the invention may be combined with one or more features of other embodiments without departing from the scope of the invention. The specification and drawings are, accordingly, to be regarded in an illustrative rather than a restrictive sense. Thus, the scope of the present invention should be determined not with reference to the above description, but should be determined with reference to the appended claims along with their full scope of equivalents.

What is claimed is:

1. A VoIP switch configured to receive electrical power over Ethernet, the VoIP switch comprising:
    a first input Ethernet port configured to receive electrical power from a first power sourcing equipment;
    a second input Ethernet port configured to receive electrical power from a second power sourcing equipment; and
    a power supply coupled to the first input Ethernet port and to the second input Ethernet port, wherein the VoIP switch is configured such that the first input Ethernet port is powered by the first power sourcing equipment concurrently with the second input Ethernet port being powered by the second power sourcing equipment.

2. The VoIP switch of claim 1 wherein the first input Ethernet port and the second input Ethernet port are configured to be powered by the first power sourcing equipment and the second power sourcing equipment, respectively, each using at least about 10 mA of electrical current for at least about 75 ms with no more than about 250 ms since a last use.

3. The VoIP switch of claim 1 wherein the first input Ethernet port is configured to receive electrical power from the first power sourcing equipment simultaneously with the second input Ethernet port receiving electrical power from the second power sourcing equipment.

4. The VoIP switch of claim 1 wherein the VoIP switch is configured such that the first input Ethernet port receives electrical power from the first power sourcing equipment at times other than when the second input Ethernet port receives electrical power from the second power sourcing equipment.

5. The VoIP switch of claim 1 wherein electrical power received at the VoIP switch is provided alternately by the first power sourcing equipment and by the second power sourcing equipment.

6. The VoIP switch of claim 1 wherein the power supply comprises a switching power supply coupled to the first input Ethernet port and to the second input Ethernet port, wherein the switching power supply is configured to receive electrical power alternately from the first input Ethernet port and from the second input Ethernet port.

7. The VoIP switch of claim 1 wherein the power supply comprises a first power supply coupled to the first input Ethernet port and a second power supply coupled to the second input Ethernet port, wherein the first power supply is configured to receive electrical power from the first input Ethernet port and the second power supply is configured to receive electrical power from the second input Ethernet port.

8. The VoIP switch of claim 1 wherein the first input Ethernet port and the second input Ethernet port are further configured to receive network data.

9. The VoIP switch of claim 1 wherein the first input Ethernet port is electrically isolated from the second input Ethernet port.

10. The VoIP switch of claim 1 wherein the first power sourcing equipment is different from the second power sourcing equipment.

11. The VoIP switch of claim 1 wherein the first power sourcing equipment and the second power sourcing equipment are a same power sourcing equipment.

12. A method for receiving electrical power at a powered device, the method comprising:
    receiving first electrical power using a first input Ethernet port at the powered device, the first electrical power received from a first power sourcing equipment; and
    receiving second electrical power using a second input Ethernet port at the powered device, the second electrical power received from a second power sourcing equipment, wherein the first input Ethernet port is powered by the first power sourcing equipment concurrent with the second input Ethernet port being powered by the second power sourcing equipment.

13. The method of claim 12 wherein the first electrical power is received at the powered device using the first input Ethernet port simultaneous with the second electrical power being received at the powered device using the second input Ethernet port.

14. The method of claim 12 wherein the first electrical power is not received at the powered device using the first input Ethernet port simultaneous with the second electrical power being received at the powered device using the second input Ethernet port.

15. The method of claim 12 wherein electrical power is received at the powered device alternately using the first input Ethernet port and using the second input Ethernet port.

16. A powered device comprising:
    a first input port configured to receive electrical power and network data; and
    a second input port configured to receive electrical power and network data, wherein the first input port and the second input port are configured such that the first input port is powered by a first power sourcing equipment concurrently with the second input port being powered by a second power sourcing equipment.

17. The powered device of claim 16 wherein the first input port comprises an Ethernet port.

18. The powered device of claim 16 wherein the first input port comprises an Universal Serial Bus port.

19. The powered device of claim 16 wherein the first input port is configured to receive electrical power at the same time that the second input port receives electrical power.

* * * * *